US010803380B2

(12) United States Patent
Dai et al.

(10) Patent No.: US 10,803,380 B2
(45) Date of Patent: Oct. 13, 2020

(54) GENERATING VECTOR REPRESENTATIONS OF DOCUMENTS

(71) Applicant: Google LLC, Mountain View, CA (US)

(72) Inventors: Andrew M. Dai, San Francisco, CA (US); Quoc V. Le, Mountain View, CA (US); Gregory Sean Corrado, San Francisco, CA (US)

(73) Assignee: Google LLC, Mountain View, CA (US)

( * ) Notice: Subject to any disclaimer, the term of this patent is extended or adjusted under 35 U.S.C. 154(b) by 660 days.

(21) Appl. No.: 15/262,959

(22) Filed: Sep. 12, 2016

(65) Prior Publication Data
US 2020/0293873 A1 Sep. 17, 2020

Related U.S. Application Data

(60) Provisional application No. 62/217,453, filed on Sep. 11, 2015.

(51) Int. Cl.
*G06N 3/08* (2006.01)
*G06F 40/279* (2020.01)

(52) U.S. Cl.
CPC ............. *G06N 3/08* (2013.01); *G06F 40/279* (2020.01)

(58) Field of Classification Search
CPC .......... G06F 16/31; G06N 20/00; G06N 3/08
See application file for complete search history.

(56) References Cited

U.S. PATENT DOCUMENTS

| 8,856,123 B1* | 10/2014 | Forman | G06F 16/31 707/737 |
|---|---|---|---|
| 9,037,464 B1 | 5/2015 | Mikolov et al. | |
| 2008/0027925 A1* | 1/2008 | Li | G06F 16/951 |
| 2014/0229158 A1* | 8/2014 | Zweig | G06N 3/04 704/9 |
| 2015/0220833 A1 | 8/2015 | Le | |

OTHER PUBLICATIONS

Kusner, From Word Embedding To Document Distances, Jul. 2015, vol. 37, JMLR.org (Year: 2015).*
Quoc Le, Distributed Representations of Sentences and Documents, 2014 (Year: 2014).*
Lebret, "Word Embeddings through Hellinger PCA", 2014 (Year: 2014).*

(Continued)

*Primary Examiner* — Ann J Lo
*Assistant Examiner* — Van C Mang
(74) *Attorney, Agent, or Firm* — Fish & Richardson P.C.

(57) ABSTRACT

Methods, systems, and apparatus, including computer programs encoded on computer storage media, for generating document vector representations. One of the methods includes obtaining a new document; selecting a plurality of new document word sets; and determining a vector representation for the new document using a trained neural network system, wherein the trained neural network system comprises: a document embedding layer and a classifier, and wherein determining the vector representation for the new document using the trained neural network system comprises iteratively providing each of the plurality of new document word sets to the trained neural network system to determine the vector representation for the new document using gradient descent.

18 Claims, 7 Drawing Sheets

(56) References Cited

OTHER PUBLICATIONS

LeCun, "Deep Learning", 2015 (Year: 2015).*
Tang, "Learning Sentiment-Specific Word Embedding for Twitter Sentiment Classification", 2014 (Year: 2014).*
Blei et al. "Latent Dirichlet Allocation," Journal of Machines Learning Research, Jan. 2013, 30 pages.
Harris. "Distributional structure," Word 10.2-3, Aug. 1954, 18 pages.
Le et al. "Distributed representations of sentences and documents," International Conference on Machine Learning, Jun. 21, 2014, 9 pages.
Mikolov et al. "Efficient estimation of word representations in vector space," arXiv preprint arXiv 1301.3781v3, Sep. 7, 2013, 12 pages.
Van der Maaten et al. "Visualizing high-dimensional data using t-SNE," Journal of Machine Learning Research, Nov. 2008, 27 pages.

* cited by examiner

US 10,803,380 B2

GENERATING VECTOR REPRESENTATIONS OF DOCUMENTS

CROSS-REFERENCE TO RELATED APPLICATION

This application claims priority to U.S. Provisional Application No. 62/217,453, filed on Sep. 11, 2015. The disclosure of the prior application is considered part of and is incorporated by reference in the disclosure of this application.

BACKGROUND

This specification relates to text classification using data processing systems.

Text classification systems can classify pieces of electronic text, e.g., electronic documents. For example, text classification systems can classify a piece of text as relating to one or more of a set of predetermined topics. Some text classification systems receive as input features of the piece of text and use the features to generate the classification for the piece of text.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, one innovative aspect of the subject matter described in this specification can be embodied in methods of generating a document vector representation for a new document.

Other embodiments of this and other aspects include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. A vector representation of a document that can be used as a feature of the document, e.g., by a text classification system, can be effectively generated. A neural network system can be trained to generate the document representation using only unlabeled training documents. The vector representations generated by the trained neural network system can have several desirable properties. For example, documents that are semantically similar can have document vector representations that are closer together than the document vector representations for two documents that do not include semantically similar content. Thus, the vector representations can be used as document features for many useful tasks, e.g., finding documents that relate to a current document, or finding other documents that may be of interest to a user given that the user browsed a current document.

Additionally, by jointly training the neural network system with a word embedding layer and a document embedding layer, the quality of the document vector representations generated by the document embedding layer once the neural network system has been trained can be improved.

Additionally, by simplifying the prediction task performed by the neural network system to not use any local context, i.e., by processing only a document vector or a word vector using the classifier rather than a combined vector representation generated from a document vector and word vector representations of a word sequence from the document, the architecture of the neural network system can be simplified, reducing the computational footprint, and the document vector representations can be more efficiently generated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
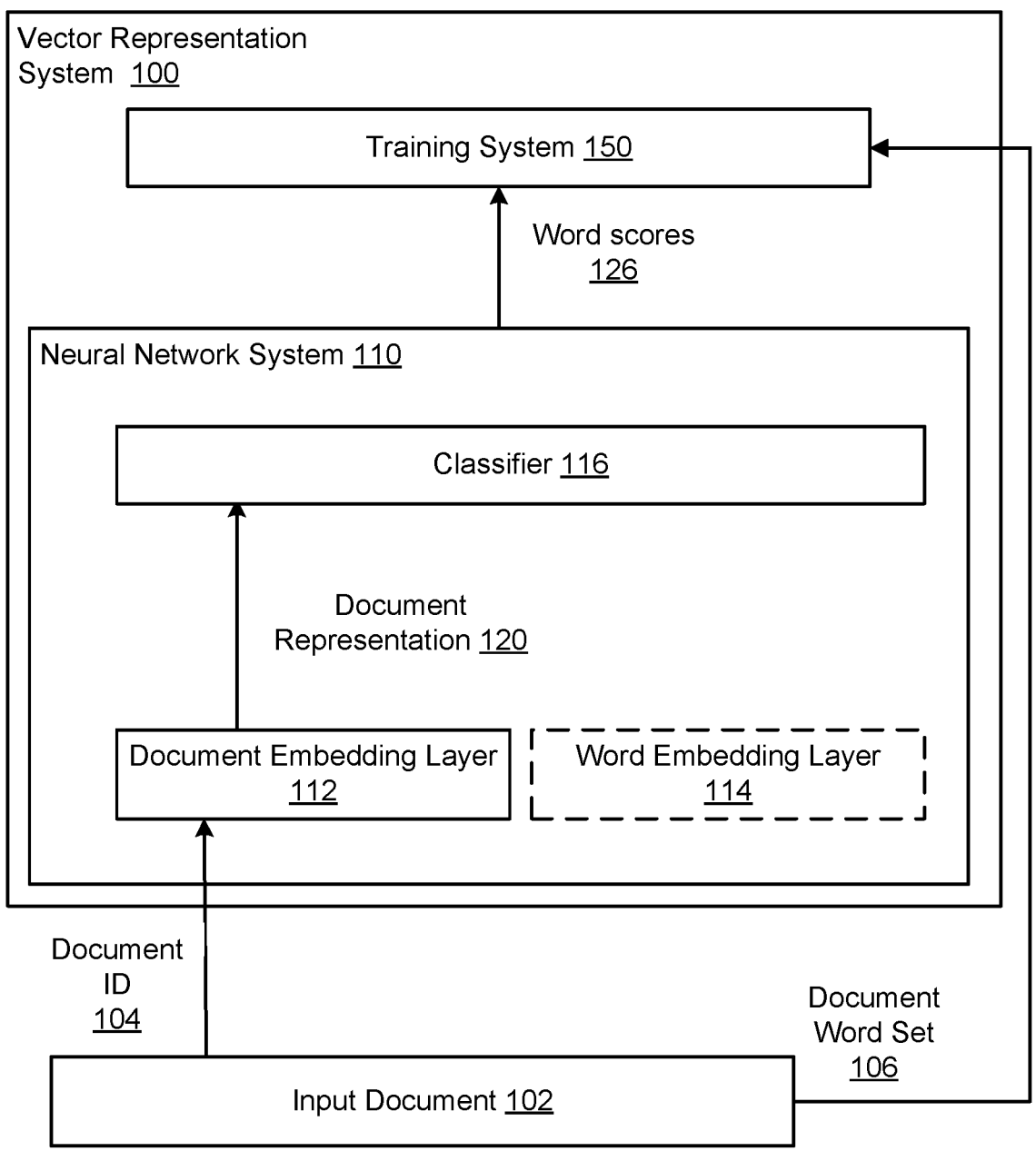
FIG. 1 shows an example vector representation system.

FIG. 1 shows an example vector representation system 100. The vector representation system 100 is an example of a system implemented as computer programs on one or more computers in one or more locations, in which the systems, components, and techniques described below can be implemented.

The vector representation system 100 generates document vector representations for input documents. The document vector representation generated by the vector representation system 100 for a given document is a numeric representation of the document. For example, the document vector representations may be vectors or other ordered collections of numeric values that include floating-point values or quantized floating-point values.

The vector representation system 100 includes a neural network system 110 that receives data identifying an input document and processes the data identifying the input document to generate a set of word scores 126. For example, the vector representation system 100 can receive a document identifier 104 for an input document 102 and generate the word scores 126. The document identifier may be, e.g., pre-assigned to the input document 102 or be generated by the vector representation system 100 such that the identifier uniquely identifies the input document 102.

The word scores 126 include a respective word score for each word in a pre-determined set of words, and the word score for a given word represents a predicted likelihood that the given word is a word that appears in the input document 102.

The neural network system 110 includes a document embedding layer 112 and a classifier 116.

The document embedding layer 112 maps the data identifying the document to a document vector representation, e.g., the document vector representation 120 for the new document 102, in accordance with current values of a set of document parameters.

The classifier 116 receives the document vector representation 120 and processes the document vector representation to generate the set of word scores 126 in accordance with current values of a set of classifier parameters.

A training system 150 receives the document word set 106 and the word scores 126 generated by the neural network system 110 for the input document and uses the word set 106 and the word scores 126 to adjust the values of the parameters of the classifier 116 and the document embedding layer 112.

In particular, the training system 150 trains the neural network system 110 on multiple word sets from training documents in order to determine trained values of the classifier parameters. Training the neural network system is described in more detail below with reference to FIGS. 2-6.

In some implementations, for purposes of training, the neural network system 110 also includes a word embedding layer 114 that maps an input word to a word vector representation in accordance with current values of a set of word parameters. In these implementations, the training system 150 also uses the word embedding layer 114 during the training of the neural network system 110. Using the word embedding layer during training is described below with reference to FIGS. 3, 4, and 6.

Once trained values of the classifier parameters have been determined, the vector representation system 100 can receive a new input document and process the identifier from the new input document using the neural network system 110 to determine a document vector representation for the new document. Generating a document vector representation for a new document is described in more detail below with reference to FIGS. 2 and 7.

Once the document vector representation for a given document has been generated, the vector representation system 100 can associate the document vector representation with the document in a repository or provide the document representation to a separate system for use for some immediate purpose. For example, the document representation can be used as a feature of the input document and can be provided as input to a conventional machine learning system, e.g., a logistic regression system, a Support Vector Machines (SVM) system, or a k-means system, that has been configured to classify input documents, e.g., as relating to particular topics. For example, the conventional machine learning system may be configured to receive the document representation of the input document and, optionally, other features of the input document and generate a respective score for each of a set of topics, with each score representing an estimated likelihood that the document is about or relates to the corresponding topic.

Figure 2:
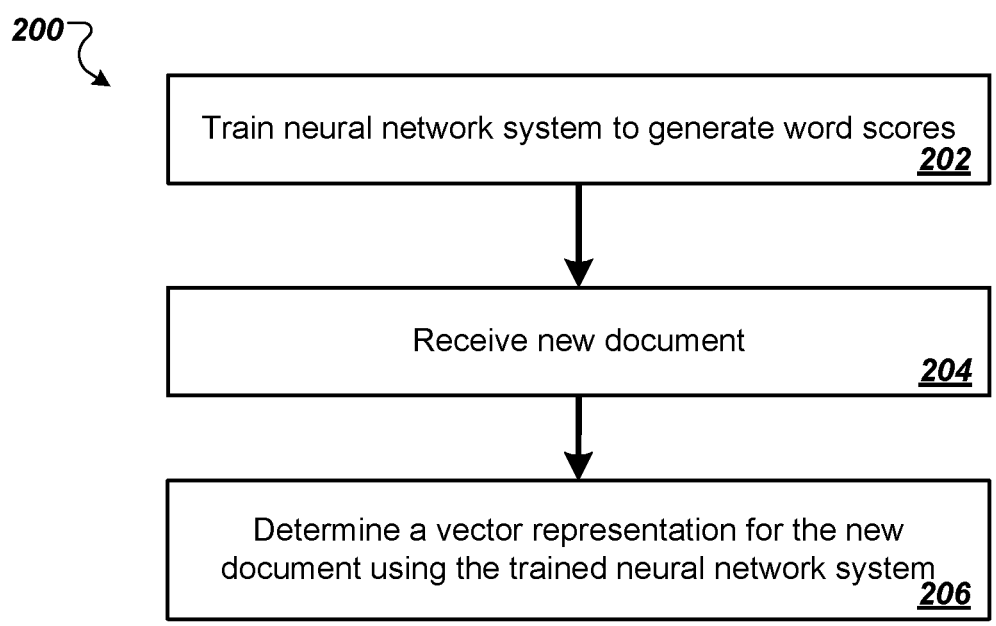
FIG. 2 is a flow diagram of an example process for determining a document vector representation for a new document.

FIG. 2 is a flow diagram of an example process 200 for determining a document vector representation for a new document. For convenience, the process 200 will be described as being performed by a system of one or more computers located in one or more locations. For example, a vector representation system, e.g., the vector representation system 100 of FIG. 1, appropriately programmed, can perform the process 200.

The system trains a neural network system, e.g., the neural network system 110 of FIG. 1, to generate word scores (step 202). The neural network system is a system that includes a document embedding layer, a classifier, and, optionally, a word embedding layer. The document embedding layer is configured to receive data identifying a document and map the data identifying the document to a document vector representation in accordance with current values of a set of document parameters. The word embedding layer is configured to map a word to a word vector representation in accordance with current values of a set of word parameters. The classifier is configured to process either a document vector representation or a word vector representation to generate a set of word scores for the word sequence in accordance with current values of a set of classifier parameters.

During the training, the system adjusts the values of the classifier parameters to determine trained values of the classifier parameters. In particular, the system trains the neural network system on a set of training documents. The training documents may include, for example, one or more of: sentences, paragraphs, collections of multiple paragraphs, search queries, or other collections of multiple natural language words.

Generally, the training documents in the set of training documents do not need to be labeled in order to be used in training the neural network system. That is, the system can train the neural network system to generate word scores using only words from unlabeled training documents, i.e., documents that have not been classified as relating to any particular topic or otherwise been processed by a text classification system.

Training the neural network system is described below with reference to FIGS. 3-6.

The system receives a new document (step 204). The new document may be, for example, a sentence, a paragraph, a collection of multiple paragraphs, a search query, or another collection of multiple natural language words.

The system determines a document vector representation for the new document using the trained neural network system (step 206). Generally, the system processes multiple word sets from the new document using the trained neural network system to determine the document vector representation for the new document. In particular, the system selects multiple sets of words from the new document that each include the same fixed number of words. For example, the system can select a predetermined number of word sets from the new document, with the words in each word set being randomly selected. As another example, the number of word sets can be proportional to the length of the document. As yet another example, the system can continue randomly selecting word sets until a predetermined proportion of the words in the new document have been included in more than a threshold number of word sets.

The system can then process each of the word sets using the trained neural network system in order to iteratively determine the document vector representation for the new document. That is, the system adjusts the current representation of the new document after each word set from the new document is processed through the trained neural network sequence to generate word scores for the sequence. Adjusting a document vector representation for a new document using a word set from the new document is described in more detail below with reference to FIG. 7.

As described above, in some implementations, the neural network system includes a word embedding layer. In these implementations, during training of the neural network system, the system can process word vector training sets from training documents in addition to document vector training sets from the training documents in order to train the classifier, the word embedding layer, and the document embedding layer.

Figure 3:
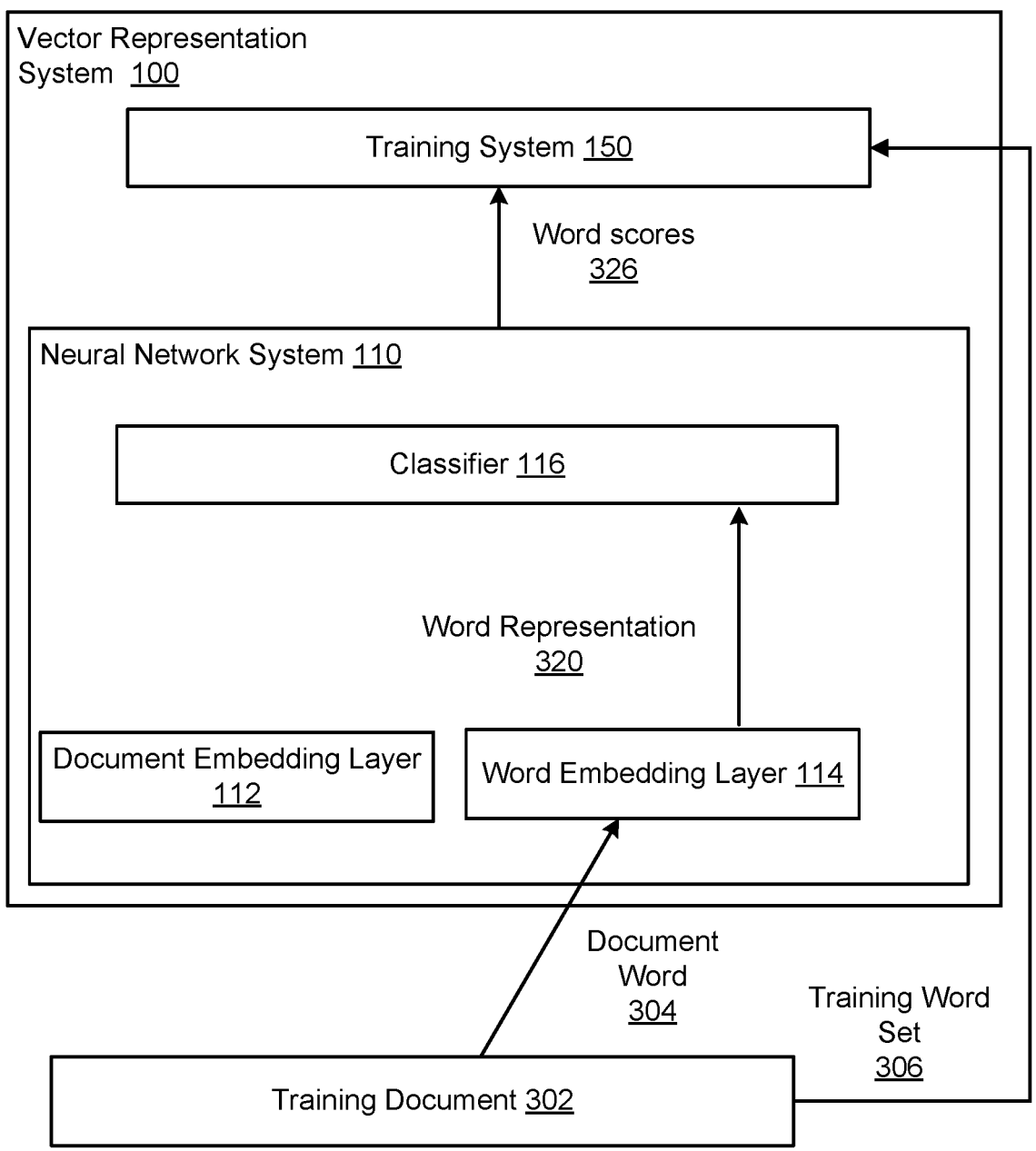
FIG. 3 shows the example vector representation system during processing of a word vector training set selected from a training document.

FIG. 3 shows the example vector representation system 100 during processing of a word vector training set from a training document 302.

The word vector training set includes a document word 304 that has been selected from the training document 302 and a training word set 306 that includes multiple surrounding words from the training document 302. In particular, each of the surrounding words in the training word set appears within a window of a specified size, e.g. within a specified number of words, of the document word 304 in the training document 302.

The word embedding layer 114 maps the document word 304 to a word vector representation, e.g., a word vector representation 320 for the document word 304, in accordance with current values of a set of word parameters. The word vector representation generated by the vector representation system 100 for a given document word is a numeric representation of the document word that is the same dimensionality as the document vector representations generated by the vector representation system 100.

The classifier 116 receives the word vector representation and processes the word vector representation to generate a set of word scores in accordance with current values of the set of classifier parameters.

During the training of the neural network system 110, the training system 150 can use the word scores 326 and the training word set 306 to adjust the current values of the parameters of the classifier and the word embedding layer 114. Adjusting the values of these parameters is described in more detail below with reference to FIGS. 4-6.

Figure 4:
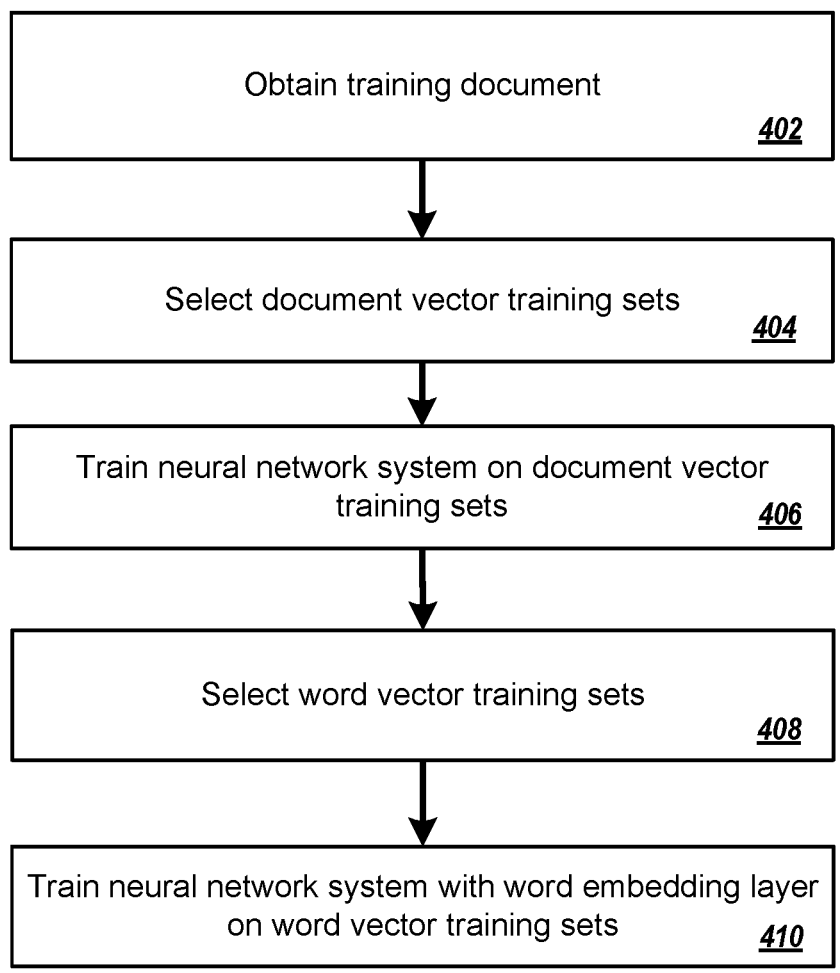
FIG. 4 is a flow diagram of an example process for training a neural network system.

FIG. 4 is a flow diagram of an example process 400 for training a neural network system. For convenience, the process 400 will be described as being performed by a system of one or more computers located in one or more locations. For example, a vector representation system, e.g., the vector representation system 100 of FIG. 1, appropriately programmed, can perform the process 400.

The system obtains a training document from a set of multiple training documents being used to train the neural network system (step 402).

The system selects document vector training sets from the training document (step 404).

Each document vector training set includes a fixed number of words that have been selected, e.g., randomly selected, from the training document.

For example, the system can select a predetermined number of word sets from the training document, with the words in each word set being randomly selected. As another example, the number of training sets can be proportional to the length of the training document. As yet another example, the system can continue randomly selecting training sets until a predetermined proportion of the words in the training document have been included in more than a threshold number of training sets.

The system trains the neural network system on the document vector training sets to adjust the values of the parameters of the classifier and the document embedding layer (step 406). That is, the system trains the neural network system on each of the document vector training sets to iteratively adjust the values of the parameters of the classifier and the document embedding layer. Training the neural network system on a document vector training set is described below with reference to FIG. 5.

The system selects word vector training sets from the training document (step 408). Each word vector training set includes a document word from the document and a fixed number of surrounding words that appear within a specified window of the document word in the training document. The document word in each word vector training set can be randomly selected from the document and the surrounding words can be the words that are closest to the document word or can be randomly selected from the words that are within the specified window of the document word in the training document.

For example, the system can select a predetermined number of word vector training sets from the training document, with the words in each word vector training set being randomly selected from the words that are within the window of the document word in the training document. As another example, the number of word vector training sets can be proportional to the length of the training document. As yet another example, the system can continue randomly selecting word vector training sets until a predetermined proportion of the words in the training document have been included in more than a threshold number of word vector training sets.

The system trains the neural network system on the word vector training sets to adjust the values of the parameters of the classifier and the word embedding layer (step 410). That is, the system trains the neural network system on each of the word vector training sets to iteratively adjust the values of the parameters of the classifier and the word embedding layer. Training the neural network system on a word vector training set is described below with reference to FIG. 6.

For a given training document, the system can either (i) first train the neural network system on the word vector training sets from the training document and then train the neural network system on the document vector training sets from the training document or (ii) first train the neural network system on the document vector training sets from the training document and then train the neural network system on the word vector training sets from the training document, depending on how the system has been configured.

Figure 5:
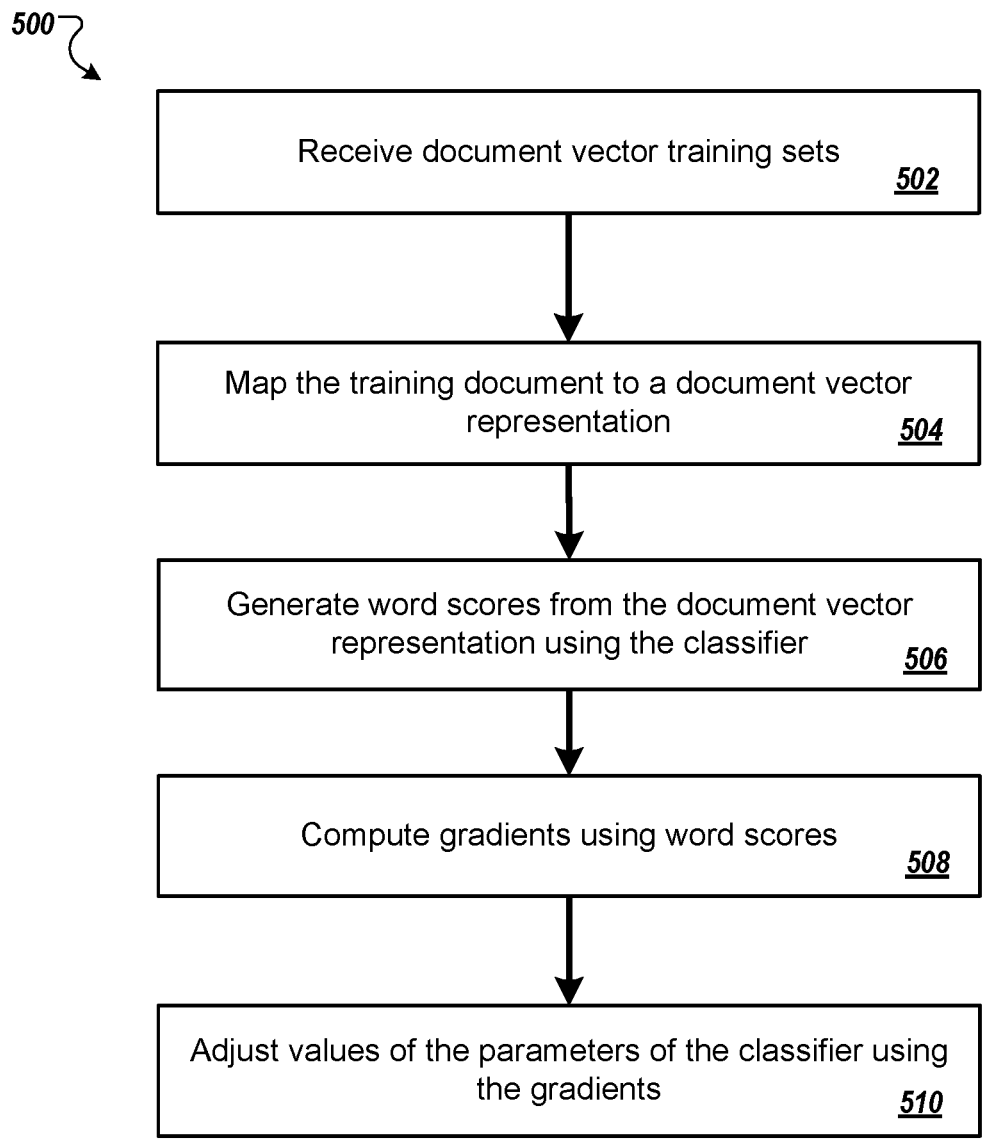
FIG. 5 is a flow diagram of an example process training a neural network system on a document vector training set selected from a training document.

FIG. 5 is a flow diagram of an example process 500 for training a neural network system on a document vector training set selected from a training document. For convenience, the process 500 will be described as being performed by a system of one or more computers located in one or more locations. For example, a vector representation system, e.g., the vector representation system 100 of FIG. 1, appropriately programmed, can perform the process 500.

The system receives a current document vector training set from the training document (step 502). The document vector training set includes a fixed numbers of words selected from the training document.

The system maps a document identifier for the training document to a document vector representation using the document embedding layer (step 504). In particular, the system processes the document identifier in accordance with current values of the document parameters to determine a document vector representation for the training document.

The system generates word scores from the document vector representation using the classifier (step 506). In particular, the system processes the document vector representation using the classifier in accordance with the current values of the classifier parameters to generate a set of word scores.

The system computes gradients using the word scores (step 508). That is, for each word in the training set, the system computes an error between the word scores generated by the classifier and the target output for the word, i.e., a set of word scores that indicates that the word in the training set is the word that should have been identified as appearing in the document by the classifier, and then computes the gradient of the error.

The system adjusts current values of the parameters of the classifier using the gradient (step 510). In particular, the system adjusts the current values of the parameters of the classifier using the gradient of the error and then adjusts the current values of the parameters of the document embedding layer, i.e., the current values of the document parameters, using backpropagation.

Figure 6:
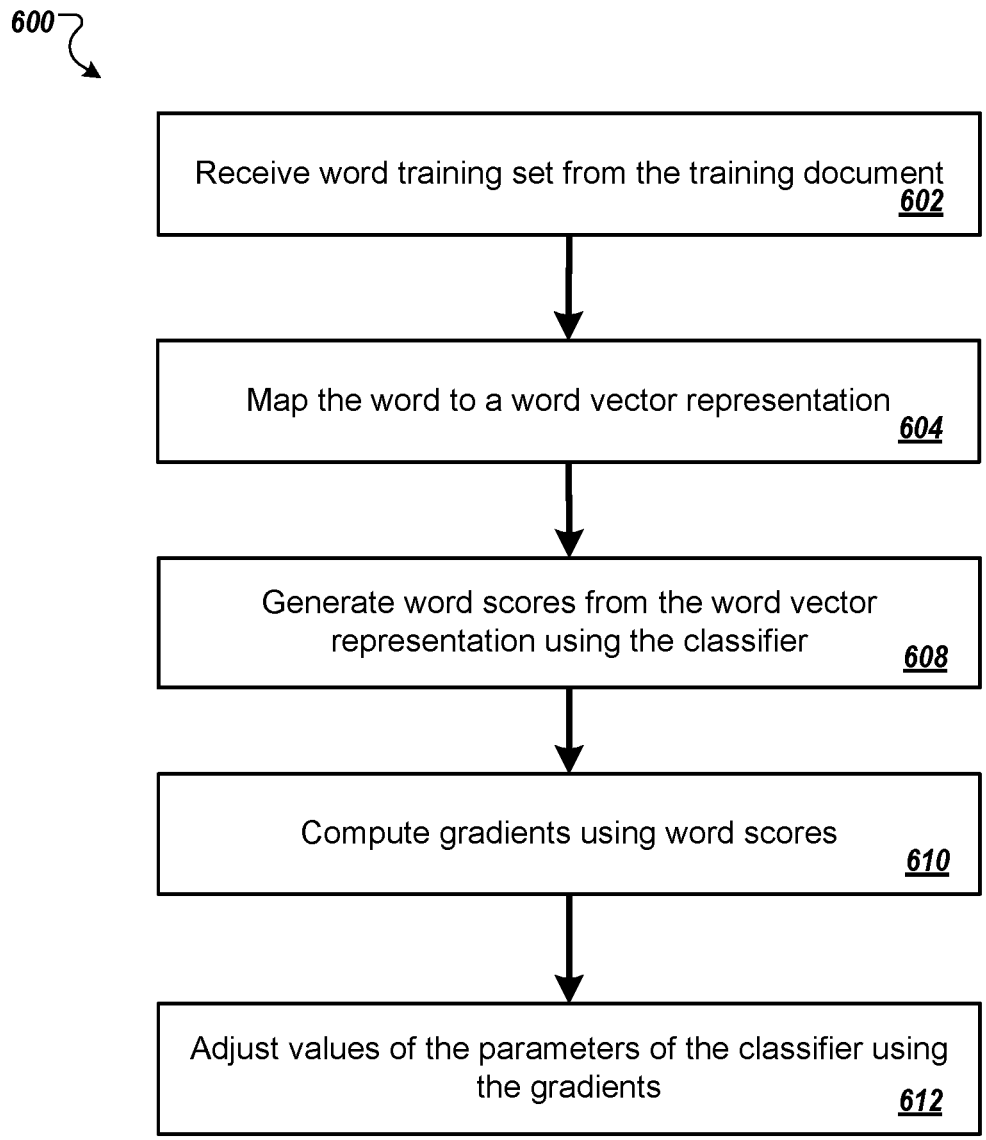
FIG. 6 is a flow diagram of an example process for training a neural network system on a word training set selected from a training document.

FIG. 6 is a flow diagram of an example process 600 for training a neural network system on a word training set selected from a training document. For convenience, the process 600 will be described as being performed by a system of one or more computers located in one or more locations. For example, a vector representation system, e.g., the vector representation system 100 of FIG. 1, appropriately programmed, can perform the process 600.

The system receives a current word vector training set from the training document (step 602). The word training set includes a current word from the training document and a predetermined number of surrounding words from the training document that each appear within a window of the current word in the training document.

The system maps the current word to a word vector representation using the word embedding layer (step 604). In particular, the system processes the current word in accordance with current values of the word parameters to determine a word vector representation for the current word.

The system generates word scores from the word vector representation using the classifier (step 606). In particular, the system processes the word vector representation using the classifier in accordance with the current values of the parameters of the classifier to generate a set of word scores.

The system computes gradients using the word scores (step 608). That is, for each surrounding word in the training set, the system computes an error between the word scores generated by the classifier and the target output for the surrounding word, i.e., a set of word scores that indicates that the surrounding word is the word that should have been identified as appearing in the document by the classifier, and then computes the gradient of the error.

The system adjusts current values of the parameters of the classifier using the gradient (step 610). In particular, the system adjusts the current values of the parameters of the classifier using the gradient of the error and then adjusts the current values of the parameters of the word embedding layer, i.e., the current values of the word parameters, using backpropagation.

The system can perform the processes 400, 500, and 600 for each of multiple training documents in order to iteratively determine the trained values of the parameters of the classifier. In particular, the system can perform iterations of the process 400 on training documents until each training document available to the system has been processed or until other termination criteria for the training have been satisfied.

Figure 7:
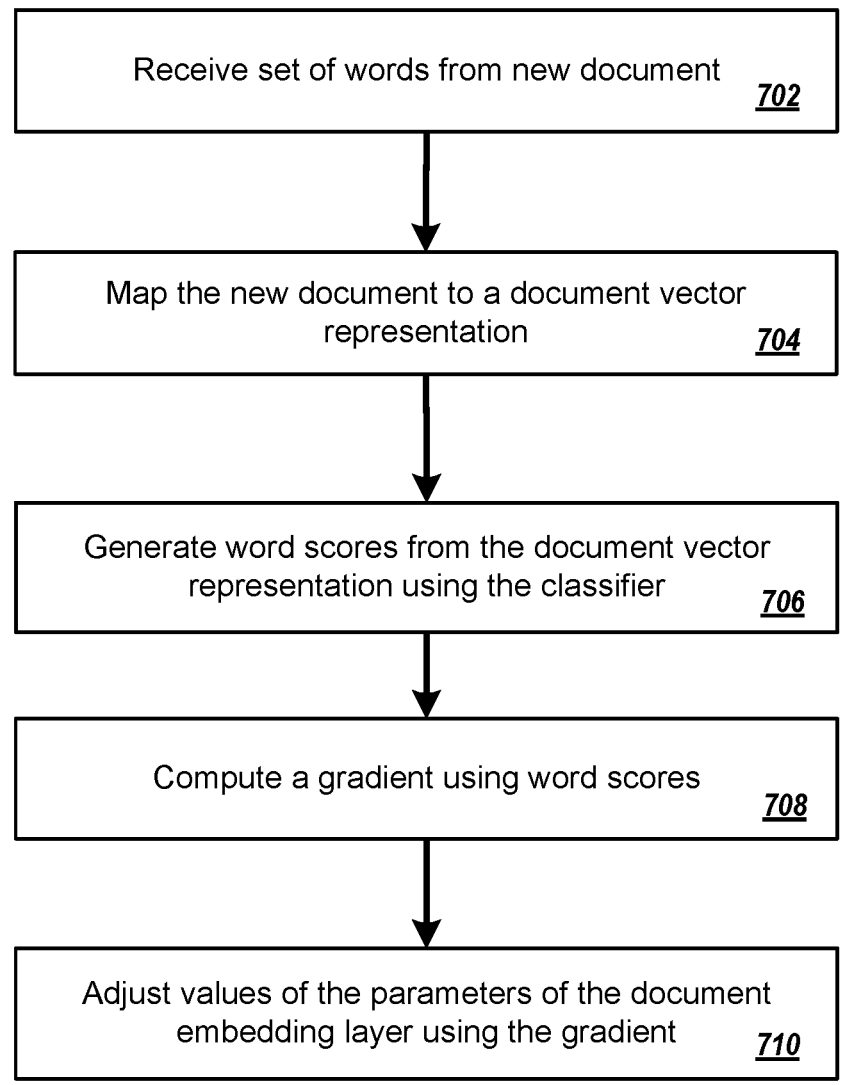
FIG. 7 is a flow diagram of an example process for adjusting the document vector representation for a new document.

FIG. 7 is a flow diagram of an example process 700 for adjusting the document vector representation for a new document. For convenience, the process 700 will be described as being performed by a system of one or more computers located in one or more locations. For example, a vector representation system, e.g., the vector representation system 100 of FIG. 1, appropriately programmed, can perform the process 700.

The system receives a set of words from the new document (step 702). For example, the set of words may be a predetermined number of words that have been selected, e.g., randomly selected, from the new document.

The system maps the new document to a document vector representation (step 704). That is, the system processes data identifying the new document using the document embedding layer to map the new document to a document vector representation in accordance with current values of the document parameters.

The system generates word scores from the combined representation using the classifier (step 706). In particular, the system processes the document representation using the classifier in accordance with the trained values of the parameters of the classifier to generate a set of word scores.

The system computes gradients using the word scores (step 708). That is, for each of the words in the set of words, the system computes an error between the word scores generated by the classifier and the target output for the word, i.e., a set of word scores that indicates that the word in the set of words is the word that appears in the new document, and then computes the gradient of the error.

The system adjusts the vector representation for the new document using the gradient (step 710). That is, the system holds the trained values of the parameters of the classifier fixed and updates the current values of the document parameters using backpropagation.

The system then uses the updated values of the document parameters when computing the document vector representation for the next word set from the new document. Alternatively, if the current word set is the last set to be processed from the new document, the system computes an adjusted document vector representation of the new document using the updated values of the document parameters and uses the adjusted document vector representation as the document representation of the new document.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining a training document;
selecting a plurality of document vector training sets, each document vector training set comprising a predetermined number of surrounding words from the training document;
selecting a plurality of word vector training sets, each word vector training set comprising a respective document word from the training document and the predetermined number of surrounding words, wherein each surrounding word is a word that is within a window of the document word in the training document; and
training a neural network system on each of the plurality of document vector training sets and word vector training sets,
wherein the neural network system comprises:
a document embedding layer configured to receive an identifier for an input document and to map the identifier to a vector representation for the input document,
a word embedding layer configured to receive an input word and to map the input word to a vector representation of the input word, and
a classifier, wherein the classifier is configured to receive a vector representation and to generate a set of word scores from the received vector representation,
wherein the set of word scores includes a respective word score for each word in a pre-determined set of words,
wherein each of the respective word scores represents a predicted likelihood that a corresponding word is a word in the input document, and
wherein training the neural network system on each of the plurality of document vector training sets and word vector training sets comprises jointly learning parameters of the document embedding layer, parameters of the word embedding layer and parameters of the classifier by performing a respective iteration of gradient descent for each document vector training set, and performing a respective iteration of gradient descent for each word vector training set,
wherein performing the respective iteration of gradient descent for each document vector training set comprises:
processing an identifier for the training document using the document embedding layer to map the identifier to a vector representation for the training document;
processing the vector representation for the training document using the classifier to generate a set of word scores; and
determining, for each of the words from the document vector training set, a respective error between the set of word scores generated by the classifier and a target output for the word from the document vector training set that indicates that the word appears in the training document;
wherein performing the respective iteration of gradient descent for each word vector training set comprises:
processing the document word in the word vector training set using the word embedding layer to map the document word to a vector representation for the document word;
processing the vector representation for the document word using the classifier to generate a set of word scores; and
determining, for each surrounding word from the word vector training set, a respective error between the set of word scores generated by the classifier and a target output for each surrounding word from the word vector training set;
and wherein jointly learning parameters of the document embedding layer, parameters of the word embedding layer and parameters of the classifier comprises:
adjusting current values of the parameters of the classifier using the respective errors for each document vector training set and the respective errors for each word vector training set;
adjusting current values of the parameters of the word embedding layer using the respective errors for each word vector training set using backpropagation; and
adjusting current values of the parameters of the document embedding layer using the respective errors for each document vector training set by backpropagation.

2. The method of claim 1, further comprising:
providing a new document to the trained neural network system; and
determining a document vector representation for the new document using the trained neural network system.

3. The method of claim 2, wherein determining a document vector representation for the new document comprises:
selecting multiple sets of words from the new document, wherein each set of words comprises same fixed number of words; and
processing each set of words using the trained neural network system to iteratively determine the document vector representation for the new document.

4. The method of claim 2, further comprising:
associating the document vector representation of the new document with the new document stored in a repository.

5. The method of claim 2, further comprising:
providing the document vector representation for the new document to another machine learning system that has been configured to classify input documents.

6. The method of claim 5, wherein the other machine learning system comprises at least one of a logistic regression system, a Support Vector Machine (SVM) system, and a k-means system.

7. A system comprising one or more computers and one or more storage devices storing instructions that when executed by the one or more computers cause the one or more computers to perform operations comprising:
obtaining a training document;
selecting a plurality of document vector training sets, each document vector training set comprising a predetermined number of surrounding words from the training document;

selecting a plurality of word vector training sets, each word vector training set comprising a respective document word from the training document and the predetermined number of surrounding words, wherein each surrounding word is a word that is within a window of the document word in the training document; and training a neural network system on each of the plurality of document vector training sets and word vector training sets, wherein the neural network system comprises:
- a document embedding layer configured to receive an identifier for an input document and to map the identifier to a vector representation for the input document,
- a word embedding layer configured to receive an input word and to map the input word to a vector representation of the input word, and
- a classifier, wherein the classifier is configured to receive a vector representation and to generate a set of word scores from the received vector representation, wherein the set of word scores includes a respective word score for each word in a pre-determined set of words, wherein each of the respective word scores represents a predicted likelihood that a corresponding word is a word in the input document, and wherein training the neural network system on each of the plurality of document vector training sets and word vector training sets comprises jointly learning parameters of the document embedding layer, parameters of the word embedding layer and parameters of the classifier by performing a respective iteration of gradient descent for each document vector training set, and performing a respective iteration of gradient descent for each word vector training set, wherein performing the respective iteration of gradient descent for each document vector training set comprises:
- processing an identifier for the training document using the document embedding layer to map the identifier to a vector representation for the training document;
- processing the vector representation for the training document using the classifier to generate a set of word scores; and
- determining, for each of the words from the document vector training set, a respective error between the set of word scores generated by the classifier and a target output for the word from the document vector training set that indicates that the word appears in the training document;

wherein performing the respective iteration of gradient descent for each word vector training set comprises:
- processing the document word in the word vector training set using the word embedding layer to map the document word to a vector representation for the document word;
- processing the vector representation for the document word using the classifier to generate a set of word scores; and
- determining, for each surrounding word from the word vector training set, a respective error between the set of word scores generated by the classifier and a target output for each surrounding word from the word vector training set;

and wherein jointly learning parameters of the document embedding layer, parameters of the word embedding layer and parameters of the classifier comprises:

- adjusting current values of the parameters of the classifier using the respective errors for each document vector training set and the respective errors for each word vector training set;
- adjusting current values of the parameters of the word embedding layer using the respective errors for each word vector training set using backpropagation; and
- adjusting current values of the parameters of the document embedding layer using the respective errors for each document vector training set by backpropagation.

8. The system of claim 7, the operations further comprise:
providing a new document to the trained neural network system; and
determining a document vector representation for the new document using the trained neural network system.

9. The system of claim 8, wherein determining a document vector representation for the new document comprises:
selecting multiple sets of words from the new document, wherein each set of words comprises same fixed number of words; and
processing each set of words using the trained neural network system to iteratively determine the document vector representation for the new document.

10. The system of claim 8, the operations further comprise:
associating the document vector representation of the new document with the new document stored in a repository.

11. The system of claim 8, the operations further comprise:
providing the document vector representation for the new document to another machine learning system that has been configured to classify input documents.

12. The system of claim 11, wherein the other machine learning system comprises at least one of a logistic regression system, a Support Vector Machine (SVM) system, and a k-means system.

13. A computer program product encoded on one or more non-transitory computer readable media, the computer program product comprising instructions that when executed by one or more computers cause the one or more computers to perform operations comprising:
obtaining a training document;
selecting a plurality of document vector training sets, each document vector training set comprising a predetermined number of surrounding words from the training document;
selecting a plurality of word vector training sets, each word vector training set comprising a respective document word from the training document and the predetermined number of surrounding words, wherein each surrounding word is a word that is within a window of the document word in the training document; and
training a neural network system on each of the plurality of document vector training sets and word vector training sets,
wherein the neural network system comprises:
- a document embedding layer configured to receive an identifier for an input document and to map the identifier to a vector representation for the input document,
- a word embedding layer configured to receive an input word and to map the input word to a vector representation of the input word, and a classifier, wherein the classifier is configured to receive a vector representation and to generate a set of word scores from the received vector representation, wherein the set of word scores includes a respective word score for each word in a pre-determined set of words, wherein each of the respective word scores represents a predicted likelihood that a corresponding word is a word in the input document, and wherein training the neural network system on each of the plurality of document vector training sets and word vector training sets comprises jointly learning parameters of the document embedding layer, parameters of the word embedding layer and parameters of the classifier by performing a respective iteration of gradient descent for each document vector training set, and performing a respective iteration of gradient descent for each word vector training set, wherein performing the respective iteration of gradient descent for each document vector training set comprises:

processing an identifier for the training document using the document embedding layer to map the identifier to a vector representation for the training document;

processing the vector representation for the training document using the classifier to generate a set of word scores; and determining, for each of the words from the document vector training set, a respective error between the set of word scores generated by the classifier and a target output for the word from the document vector training set that indicates that the word appears in the training document;

wherein performing the respective iteration of gradient descent for each word vector training set comprises:

processing the document word in the word vector training set using the word embedding layer to map the document word to a vector representation for the document word;

processing the vector representation for the document word using the classifier to generate a set of word scores; and determining, for each surrounding word from the word vector training set, a respective error between the set of word scores generated by the classifier and a target output for each surrounding word from the word vector training set;

and wherein jointly learning parameters of the document embedding layer, parameters of the word embedding layer and parameters of the classifier comprises:

adjusting current values of the parameters of the classifier using the respective errors for each document vector training set and the respective errors for each word vector training set;

adjusting current values of the parameters of the word embedding layer using the respective errors for each word vector training set using backpropagation; and adjusting current values of the parameters of the document embedding layer using the respective errors for each document vector training set by backpropagation.

14. The computer program product of claim 13, the operations further comprise:

providing a new document to the trained neural network system; and determining a document vector representation for the new document using the trained neural network system.

15. The computer program product of claim 14, wherein determining a document vector representation for the new document comprises:

selecting multiple sets of words from the new document, wherein each set of words comprises same fixed number of words; and processing each set of words using the trained neural network system to iteratively determine the document vector representation for the new document.

16. The computer program product of claim 14, the operations further comprise:

associating the document vector representation of the new document with the new document stored in a repository.

17. The computer program product of claim 14, the operations further comprise:

providing the document vector representation for the new document to another machine learning system that has been configured to classify input documents.

18. The computer program product of claim 17, wherein the other machine learning system comprises at least one of a logistic regression system, a Support Vector Machine (SVM) system, and a k-means system.

* * * * *

UNITED STATES PATENT AND TRADEMARK OFFICE
CERTIFICATE OF CORRECTION

| | |
|---|---|
| PATENT NO. | : 10,803,380 B2 |
| APPLICATION NO. | : 15/262959 |
| DATED | : October 13, 2020 |
| INVENTOR(S) | : Dai et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*